United States Patent [19]

Ceska

[11] 3,724,832
[45] Apr. 3, 1973

[54] OLEO-PNEUMATIC SHOCK ABSORBER

[75] Inventor: Frank Z. Ceska, Montreal, Canada

[73] Assignee: Menasco Manufacturing of Canada, Ltd., Quebec, Canada

[22] Filed: Mar. 9, 1971

[21] Appl. No.: 122,421

[52] U.S. Cl. ............................................267/64 R
[51] Int. Cl. ..............................................F16f 9/06
[58] Field of Search..................267/64 R, 64 A, 64 B

[56] References Cited

UNITED STATES PATENTS

| | | | |
|---|---|---|---|
| 3,533,613 | 10/1970 | Bendicsen | 267/64 R |
| 3,265,381 | 8/1966 | Katz et al | 267/64 A |

Primary Examiner—James B. Marbert
Attorney—Robert E. Geaque

[57] ABSTRACT

A two-stage oleo-pneumatic shock absorber incorporating two pneumatic (air) pressure chambers, a high air pressure chamber and a low pressure (air) chamber, separated by a hydraulic fluid (oil) pressure chamber. The oil chamber contains an orifice and metering pin, which orifice and metering pin control the rate of collapse of the low pressure air chamber. It also contains a second orifice and metering pin which control the rate of collapse of the high pressure air chamber. Both metering pins are preprogrammed so as to interact with each other and effect a nearly constant load throughout the stroke of the shock absorber, even under transient loading conditions.

12 Claims, 3 Drawing Figures

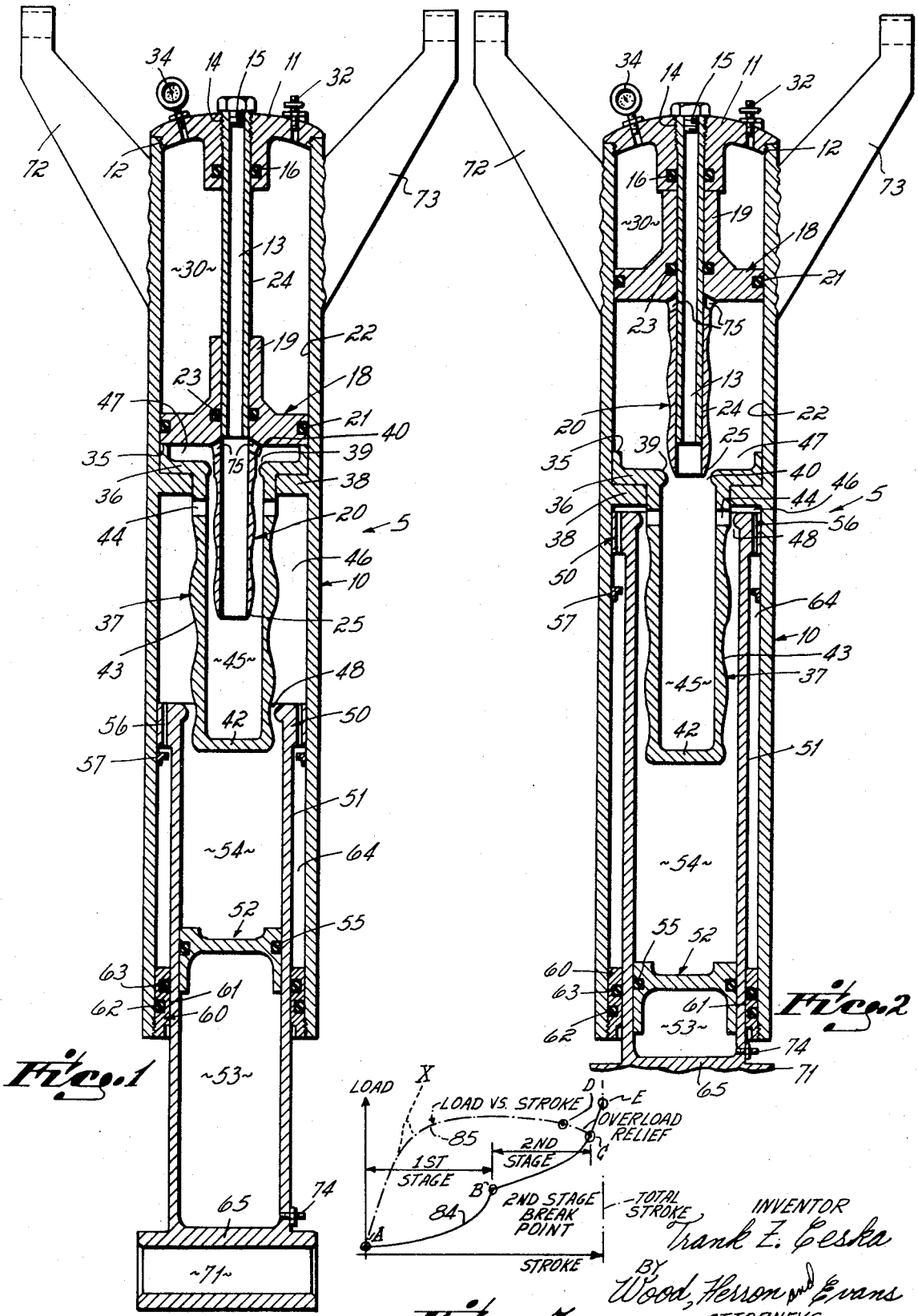

OLEO-PNEUMATIC SHOCK ABSORBER

BACKGROUND OF THE INVENTION

This invention relates to shock absorbers and particularly to shock absorbers of the oleo-pneumatic type wherein a novel overload relief is provided which enhances the working characteristics of the shock absorber. Shock absorbers of this general type are known and have proved to function particularly well for use in the shock strut of an aircraft. A shock absorber of this type is disclosed in U.S. Pat. No. 2,959,410 and in pending U.S. patent application Ser. No. 812,652 which application is assigned to the assignee of this application.

A requirement of all aircraft shock absorbers is that they absorb or dissipate the energy of descent or transient or vertical shocks without transferring them to the vehicle or aircraft structure. To this end, this type of shock absorber has previously been provided with either a spring-loaded or a pneumatically loaded relief valve which vents oil when excessive fluid pressure is created in an oil chamber of the shock absorber. Such type relief valves, though, are limited in the magnitude of transient loads and conditions they are capable of handling. In some load conditions, as for example, loads encountered by an aircraft in landing on unprepared landing sites, this type of valve is inadequate to dissipate the shocks encountered in landing without transferring them to the aircraft structure.

It has therefore been an objective of this invention to provide an oleo-pneumatic shock absorber which is capable of handling the types of transient loads and shocks encountered by an aircraft landing gear shock absorber in the course of landing on unprepared landing sites. Unprepared landing sites are those which have obstacles, as, for example, tree stumps and pot holes. Such a shock absorber must be capable of effectively reducing transient dynamic loads which result from high velocity of descent together with impact or shock loads. Otherwise expressed, it has been an objective of this invention to provide a shock absorber of the oleo-pneumatic type which is capable of absorbing the energy of impact during landing on unprepared landing sites without transferring heavy impact and transient loads while traversing obstacles through the landing gear to the aircraft structure.

These objectives are achieved and this invention is predicated upon the concept of a two-stage shock absorber with a high pneumatic pressure chamber and a low pneumatic pressure chamber separated by a hydraulic chamber together with two preprogrammed metering pins for controlling the rate of movement of the stroke of the shock absorber under varying dynamic load conditions. One metering pin acts on the first stage of the shock absorber and the other acts upon the second stage. The profiles of the metering pins are preprogrammed so as to give a nearly constant load throughout the complete stroke of the gear under all types of landing conditions including those encountered when the landing gear strikes obstacles during touchdown and taxiing.

The second stage metering pin is so configured that prior to full compression of the shock absorber the metering pin opens fully the second stage orifice to allow oil to dump and thus decrease the shock absorber load. The load thus decreases so that there is still some stroke available to prevent the shock absorber from bottoming.

The primary advantage of this shock absorber is the ability of the shock absorber to respond and maintain an even load condition on the aircraft without transferring high transient loads to the aircraft structure under severe dynamic conditions which would have caused prior shock absorbers to fail or bottom and transfer the load to the aircraft. This shock absorber also has the advantage of having minimal weight and of being capable of very rapid dynamic response to severe transient load conditions.

Other objects and advantages of this invention will become more apparent from the detailed description of the drawings in which:

FIG. 1 is a longitudinal cross section view of a shock absorber incorporating the invention of this application with the shock absorber illustrated in a fully extended or unloaded position.

FIG. 2 is a cross sectional view similar to FIG. 1 but illustrating the shock absorber in a fully collapsed condition.

FIG. 3 is a diagram graphically illustrating the dynamic load characteristics of the shock absorber of this invention.

Referring first to FIG. 1, there is illustrated a shock absorber 5 of the oleo-pneumatic type incorporating the invention of this application. This shock absorber 5 is adapted to be placed between the sprung mass and the unsprung mass of a vehicle, more particularly, between the landing gear and an aircraft structure. Specifically, this shock absorber is intended to be used in connection with the landing gear of an aircraft which is capable of landing on and taking off from unprepared fields, as, for example, a field which contains tree stumps or pot holes.

The shock absorber 5 illustrated in FIG. 1 is shown in an extended or uncompressed condition. It consists of a cylinder 10 which is closed at its upper end by a closure cap 11. This cap is threaded onto the top of the cylinder, as indicated at 12, or is an integral part of the cylinder. A hollow filling tube 13 extends axially through the cap 11 and is threaded into the cap as indicated at 14. This tube is closed by a threaded plug 15. There is a seal 16 between the tube 13 and the closure cap 11.

An annular floating piston 18 is slidably mounted over the filler tube 13 so that the filler tube acts as a guide rod for the piston. This piston 18 has a cylindrical hub section 19 on the top and a contoured second stage metering pin section 20 extending downwardly from the bottom of the piston 18. An O-ring seal 21 is located between the periphery of the piston 18 and the inside surface 22 of the cylinder 10. Another O-ring seal 23 is located between the piston and the external surface 24 of the filler tube 13. Fluid passageways or openings 75 are located at the bottom of piston head 18.

The closure cap 11, cylinder 10 and the top surface of the piston 18 together with the filler tube 13, define an air pressure chamber 30. Air under pressure, as, for example, 1600 pounds per square inch pressure, is admitted into the chamber through a filler tube 32 in the cap 11. A pressure gauge 34 extends through the cap 11 and enables the pressure in the chamber 30 to be visually determined and inspected. Pressure in the chamber 30 normally biases the piston 18 downwardly against the top surface 35 of an orifice plate 36 secured to the top of a first stage metering pin 37. This metering pin 37 and the attached orifice plate 36 are fixedly mounted on the interior of the cylinder 10 and are held in place in the cylinder by a locating ring 38. An annular flange or protrusion 39 extends inwardly from the plate 36 to define an axial orifice 40 for a second metering pin 20.

The first stage metering pin 37 is hollow and extends downwardly from the orifice plate 36. It is closed at the bottom, as indicated at 42, and is externally contoured or shaped into a noncylindrical configuration, as indicated at 43. Holes or apertures 44 in the side wall of the metering pin 37 connect the interior chamber 45 of the first stage metering pin 37 to a second stage oil chamber 46.

An axially movable annular piston head 50 is telescoped into the cylinder 10. A piston rod or piston tube 51 extends downwardly from the piston 50 and defines a chamber for a floating piston 52. The chamber is closed at the bottom by a section 65 of a lug 71.

The floating piston 52 separates and divides the interior of the piston tube 51 into a first stage or low pressure air chamber 53 and an oil pressure chamber 54. An O-ring seal 55 around the periphery of the floating piston 52 prevents the leakage of air around the piston. Air is injected into the first stage or low pressure chamber 53 through a conventional air valve 74. Generally, the air pressure in this chamber is maintained at a lower pressure than that maintained in the upper pressure chamber 30.

There may be fixed orifices 56 extending through the piston 50. These orifices 56 cooperate with rebound rings 57 to control the rate of return or extension of the shock absorber after it has been compressed.

An annular plug 60 is threaded into the bottom of the cylinder 10. The inner surface 61 of this plug defines the sliding surface for the piston tube 51. O-ring seals 62 and 63 prevent leakage of oil from a chamber 64 located between the inside 22 of the cylinder 10 and the outside of the tube 51.

The lower lug 71 is so configurated as to enable it to be connected to the wheel of an aircraft. Two additional arms 72 and 73 are integral with or connected to the top of the cylinder 10 so as to enable the top of the cylinder to be connected or attached to the aircraft structure. Where so connected, the shock absorber 5 acts as a shock strut between the wheels and aircraft structure.

Oil or hydraulic fluid is injected into the shock absorber through the filler tube 13 by removing the plug 15 and pouring the oil through the tube and into the chamber 54. The oil passes through orifices 44 and fills the upper chamber 46 around the first stage metering pin 37 and the lower chamber 54 beneath the metering pin 37. Additionally, it flows through the fixed orifices 56 into the chamber 64 and into a chamber 47 beneath the floating piston 18. To allow proper filling, passageways or openings 75 are located at the bottom of the floating piston 18 and allow filling of oil up to the bottom of filler tube 13.

OPERATION

During the landing of the aircraft, the load or force is applied to the lower end of the shock absorber or to the lug 71, causing the piston 50 to telescope into cylinder 10, as is illustrated in FIG. 2. As the piston 50 moves upwardly into the chamber 46, it causes an increase in the oil pressure in the oil chamber 46. Fluid then flows from the high pressure chamber 46 to the low pressure chamber 54 through orifice 48 in the piston. The rate at which it flows from the high pressure chamber to the low pressure chamber is determined by the undulating or wave-shaped external contour 43 of the first stage metering pin 37. This rate determines the amount of damping or rate of load change in the shock strut. As the oil flows through the orifice 48, it causes the piston 52 to be moved downwardly into the low pressure air chamber 53, thereby compressing the air in the chamber. Under slow or static loading conditions, the piston 52 moves downwardly until it reaches the bottom of the chamber 53. Thereafter, continued loading causes the pressure on the oil in chamber 45 to be transmitted through the apertures 44 and orifice 40 into the oil chamber 47 located beneath the piston 18. The piston 18 then moves upwardly as the high pressure air in chamber 30 is compressed.

Static or slow loading conditions, as described hereinabove, are graphically illustrated by the lower line 84 or line ABC of the load-stroke graph of FIG. 3. The portion of AB of line 84 indicates the portion of the load-stroke curve required for full compression of the first stage air chamber 53. The portion BC indicates the load-stroke curve which occurs during the continued loading of the shock absorber during the compression of the second stage air chamber 30. To obtain this curve, though, the load must be applied very slowly.

Dynamic response of the shock absorber of this invention follows a different curve, the curve of the line 85 in FIG. 3. This curve is the result of the interaction of the oil passing through the metering orifices 48 and 40 and the associated metering pins which generates and maintains a relatively flat load curve AC (line 85).

When the landing wheel contacts a rough area such as a stump in a landing surface, a sharp sudden transient load is applied to the landing gear tire or tires. As an example, after touchdown of the aircraft, the oil pressure in the chamber 46 quickly builds up and reaches the second stage compression pressure of chamber 30. At this point (which may occur at any stroke position) the second stage floating piston 18 and the attached second stage metering pin 37 start to move away from the original position depicted in FIG. 1, thereby allowing increased oil flow through the second stage metering orifice 40. This second stage damping combined with the first stage damping which occurs as a result of the oil flow throughout the orifice 48 is preprogrammed so as to give a nearly constant load (as indicated by the flat portion of the line 85) in the shock absorber throughout the complete stroke.

If an obstacle, as, for example, a tree stump, is encountered during the landing impact, a faster movement or increased rate of movement of the shock absorber occurs. At the same time, the second stage floating piston 18 and attached metering pin 20 move further toward the fully compressed position illustrated in FIG. 2. A sharp effective orifice size increase then occurs as a result of the tapered configuration of the end portion 25 of the metering pin 20, which increase in orifice size allows more oil to flow through the orifice and further collapse the shock absorber. This increased flow represents overload relief or so-called load "dumping." Under these circumstances the load through the shock absorber does not build up but rather decreases. As shown on the load stroke diagram portion DC of the line 85, the load descends or decreases to meet the second stage air spring curve line BC at point C. At this position, where the two curves ABC and ADC meet, some stroke is still available for situations when an obstacle is contacted during maximum loading of the shock absorber. This remaining stroke then provides for situations which previously had no solution and would have bottomed prior art shock absorbers and transferred high transient loads to the aircraft structure.

The programming of the two metering valves is controlled by the size of the orifices 40 and 48 and the contours of the metering pins 20 and 37. Since the two pins are interacting, their functions must be preprogrammed, preferably through analog representation so as to give the required dynamic characteristics of the shock absorber. As an alternative to the utilization of computer runs to test parameter changes for the orifice size and metering pin contours, experimental test runs utilizing different configurations may be utilized to obtain optimum configuration and load absorption characteristics.

The primary advantage of this invention resides in the ability of the shock absorber to absorb repeated high transient loads. The second stage metering pin does not simply open and dump the second stage oil pressure to the lower pressure chamber but opens at a controlled rate inter-related to the load and the flow then occurring through the first stage metering valve. This feature enables the shock absorber to handle transient loads which prior landing gear shock absorbers were incapable of handling. Therefore, the shock absorber enables aircraft to be landed over surfaces which have heretofore been considered too rough to permit safe landing.

While I have described only a single embodiment of my invention, persons skilled in the art to which this invention pertains will readily appreciate numerous changes and modifications which may be made without departing from the spirit of my invention. Specifically, additional air chambers may be added to the shock absorber to enable it to absorb still greater loads and to change the load-stroke curve. Additionally, the configuration and shape of the metering pins may be altered to obtain different load-stroke curve characteristics. Therefore, I do not intend to be limited except by the scope of the appended claims.

Having described my invention, I claim:

1. A shock absorber comprising a cylinder having a hydraulic chamber separated into sections by a movable piston;
   first orifice means comprising a first stage preprogrammed metering valve and a first orifice, one of which is movable with said piston and the other being fixed to said cylinder;
   a compressible high pressure chamber operatively connected to said hydraulic chamber through a second piston and capable of being changed dimensionally in response to movement of said second piston;
   said second piston being in communication with said hydraulic chamber on one side thereof;
   means for effecting relative movement between said first stage valve and said first orifice in response to application of a load to said piston, the improvement which comprises;
   second orifice means comprising a second orifice in said chamber and a second stage preprogrammed metering valve, one of which is fixed to said cylinder and the other being movable with said second piston, said second piston being movable in response to the pressure between said second orifice and said second piston for controlling the rate of compression of said high pressure chamber whereby an increase in pressure in the hydraulic chamber caused by a high pressure transient load is instantaneously and simultaneously damped by the interaction of the flow of the hydraulic fluid through the two orifices and about the two metering valves and the resulting compression of the high pressure chamber.

2. In a shock absorber as defined in claim 1 having a low pressure compressible chamber operatively connected to said hydraulic chamber on the other side thereof from said high pressure chamber and capable of being changed dimensionally in response to movement of said first piston, said low pressure chamber being divided from said hydraulic chamber by a third piston whereby an increase in pressure in the hydraulic chamber caused by a hydraulic pressure transient load results in compression of the low pressure chamber.

3. A shock absorber means as defined in claim 1 wherein said second orifice means comprises a second orifice in a plate fixed to said cylinder, said second stage metering valve being attached to said second piston.

4. A shock absorber as defined in claim 2 wherein said high pressure and said low pressure chambers comprise air spring means.

5. The shock absorber as defined in claim 1 in which said second stage preprogrammed metering valve is programmed such that it opens fully to dump hydraulic fluid from said hydraulic chamber prior to full compression of said shock absorber such that the load transmitted through said shock absorber decreases during the last portion of the stroke of the shock absorber.

6. A shock absorber comprising a cylinder having a hydraulic chamber separated into sections by a movable piston orifice plate;
   a first stage preprogrammed metering pin fixed within the hydraulic chamber and passing through the orifice in said plate;
   a high pressure chamber on one side of said hydraulic chamber being sealingly separated from said hydraulic chamber by a first piston slideably mounted in said cylinder and located at one end of said hydraulic chamber;
   means for effecting movement of said plate relative to said first stage metering pin in response to application of a load to said plate, the improvement which comprises;

a second orifice plate fixed in said hydraulic chamber and a second stage preprogrammed metering pin secured to said first piston and passing through the orifice in said second plate, said second stage metering pin being movable relative to said orifice of said second orifice plate in response to a pressure change in said chamber for controlling the rate of compression of said high pressure chamber whereby an increase in pressure in the hydraulic chamber caused by a high pressure transient load is instantaneously damped by the interaction of the flow of hydraulic fluid through the two orifices and about the two metering pins.

7. A shock absorber defined in claim 6 having a low pressure chamber on the opposite end of said hydraulic chamber from said high pressure chamber, said lower pressure chamber being sealingly separated from said hydraulic chamber by a second piston slideably mounted in said cylinder so that a change in pressure in said chamber is damped by the compression of said low pressure chamber.

8. The shock absorber as defined in claim 6 in which said second stage preprogrammed metering pin is programmed such that it opens fully to dump hydraulic fluid from said hydraulic chamber prior to full compression of said shock absorber such that the load transmitted through said shock absorber decreases during the last portion of the stroke of the shock absorber.

9. The shock absorber as defined in claim 6 wherein said first metering pin is generally hollow and said second metering pin extends into the hollow interior of said first metering pin.

10. The shock absorber as defined in claim 7 in which both said high pressure and said low pressure chambers comprise air spring means.

11. The shock absorber as defined in claim 6 wherein both said first and second metering pins have noncylindrical external contours.

12. The shock absorber as defined in claim 9 wherein said first metering pin contains flow openings connecting the hollow interior of said pin to said hydraulic chamber.

* * * * *